June 26, 1962  H. G. McCARTY ET AL  3,040,509
SIDE DELIVERY RAKE
Filed Aug. 30, 1960  2 Sheets-Sheet 1

INVENTORS
HORACE G. McCARTY
CHARLES A. SMITH
BY Joseph Allen Brown
ATTORNEY

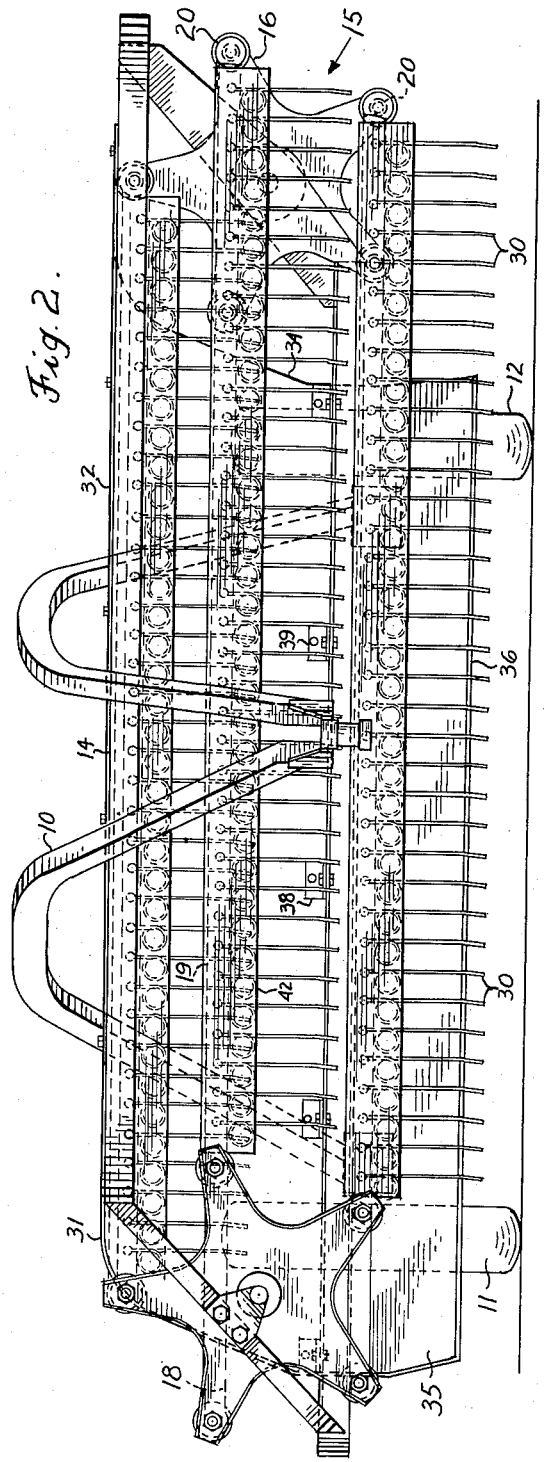

United States Patent Office 3,040,509
Patented June 26, 1962

3,040,509
SIDE DELIVERY RAKE
Horace G. McCarty and Charles A. Smith, New Holland, Pa., assignors to Sperry Rand Corporation, New Holland, Pa., a corporation of Delaware
Filed Aug. 30, 1960, Ser. No. 53,000
5 Claims. (Cl. 56—377)

The present invention relates to reel type side delivery hay rakes and more particularly to a novel means for stripping crop material from the fingers of the raking reel.

A side delivery rake of the type involved in this invention is shown in U.S. Patent No. 2,781,626 issued February 19, 1957. Such rake comprises a wheel supported frame adapted to travel forwardly. Mounted on the frame is a raking reel which extends diagonally relative to the direction of travel of the frame. The reel has a plurality of rake bars angularly disposed about the rotational axis of the reel. Each of the rake bars carries a plurality of rake fingers. Provided on the frame are stripper members to remove hay raked by the rake fingers. Conventionally, the rake stripper members comprise rods which are so disposed relative to the travel of the reel fingers that after each working stroke the bars strip the hay from the fingers. In order to provide operating clearance between the rake fingers and the stripper bars, it is necessary that the fingers have a given lateral spacing relative to each other. The spacing of the rake fingers is such that when the hay being raked is anywhere from light to heavy, an efficient and effective job will be done. However, if there has been a drought or if the rake is being used in arid areas of the United States where the hay is generally very sparse, the spacing of the fingers may result in some of the hay being missed. One way to solve this problem would be to provide additional rake fingers on the bars of the reel. However, this cannot be done and still maintain operating clearance with the stripper members.

One object of this invention is to provide a reel type side delivery hay rake having a greater number of raking fingers per rake bar than is ordinarily provided on rakes of this type, such fingers being mounted close together so that the rake will pick up all the hay, even when the material is extremely sparse.

Another object of this invention is to provide a side delivery reel type hay rake having no stripper bars, but being provided with pneumatic means for removing the hay from the rake fingers.

Another object of this invention is to provide, in a side delivery rake of the character described, shield means so related to the reel structure that air currents produced on rotation of the reel are directed against the shield and from there guided in a downward and forward direction whereby the air operates to remove or strip hay from the raking fingers.

A further object of this invention is to provide, in a hay rake of the character described, shield means having a lower edge which is disposed in operative relation to the raking fingers of the reel whereby air currents guided by the shield are directed toward the raking fingers of the reel to strip hay therefrom.

A further object of this invention is to provide a side delivery hay rake of the character described having pneumatic stripping, the stripping action being provided by a shield structure which is so mounted on the frame structure of the rake that it may be adjusted relative thereto and to the raking reel.

A still further object of this invention is to provide pneumatic stripping means which results in less leaf loss than occurs when other stripping means is employed.

Other objects of this invention will be apparent hereinafter from the specification and from the recital in the appended claims.

In the drawings:

FIG. 2 is a front elevational view of FIG. 1; and

FIG. 3 is a generally diagrammatic section taken on the line 3—3 of FIG. 1 looking in the direction of the arrows.

Figure 1:
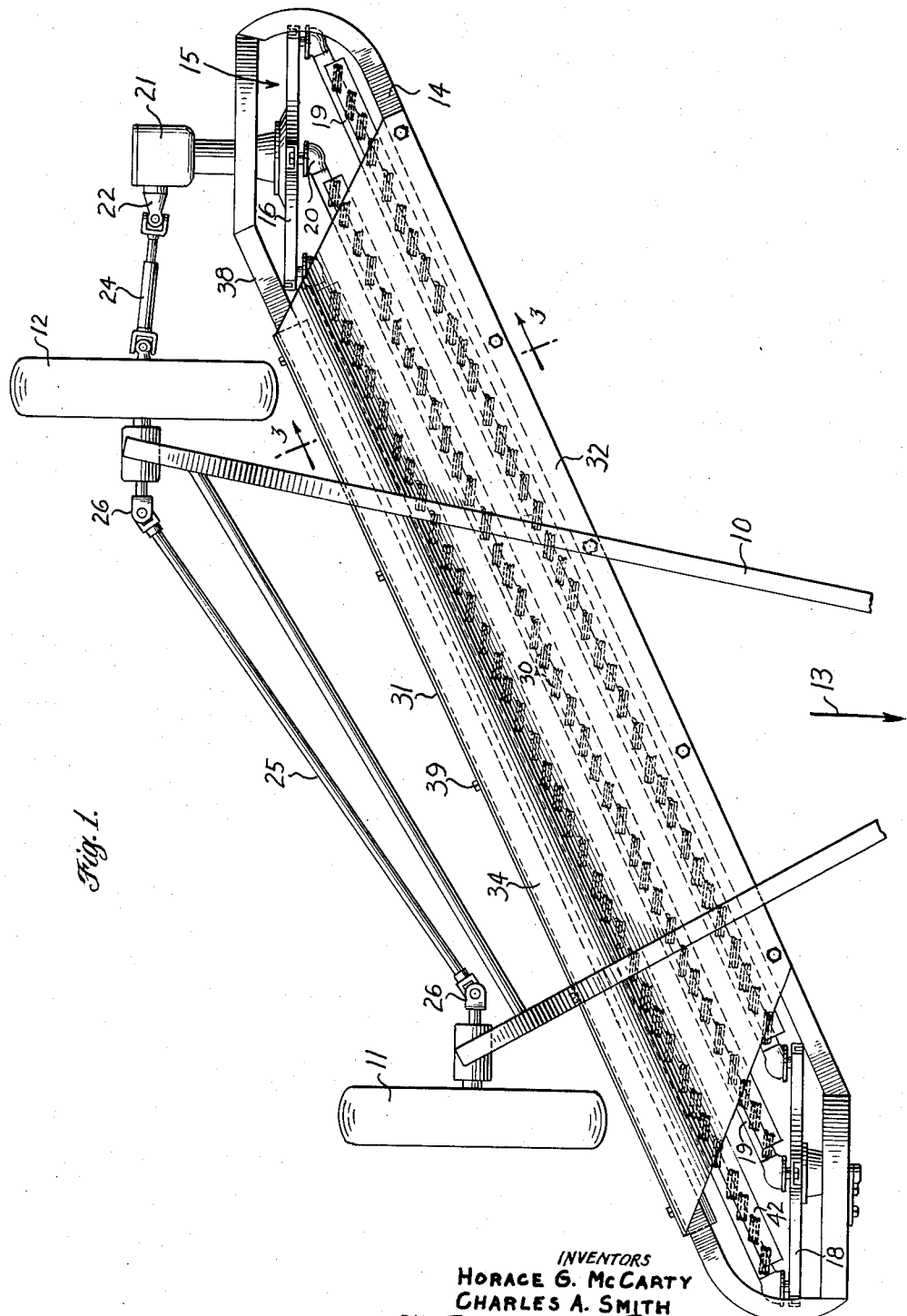
FIG. 1 is a fragmentary plan view of a side delivery rake having pneumatic stripping means constructed according to this invention.

Referring now to the drawings by numerals of reference, 10 indicates a rake frame supported by a pair of ground wheels 11 and 12 for ground travel forwardly as indicated by the arrow 13, FIG. 1. Frame 10 has mounted thereon a basket structure 14 on which a raking reel 15 is rotatably mounted. Reel 15 comprises a pair of spider members 16 and 18 rotatable about laterally spaced parallel axes. Extending between the spider members are rake bars 19 which are pivotally connected at their ends to the spiders by bearing structures 20, as shown in U.S. Patent No. 2,777,275 issued January 15, 1957. The spider 16 is power driven from a gearbox 21 having a power input shaft 22 connected to the ground wheel 12 by telescopic power transmitting members 24. Power is also derived from the ground wheel 11 through drive shaft 25 and universals 26. As is conventional, when the rake travels forwardly the rotation of the ground wheels 11 and 12 transmits power through the power transmitting means 24 to the gearbox 21 and from there to the spider 16 to drive the raking reel 15. Such overall arrangement is generally the same as that shown in U.S. Patent No. 2,929,192 issued March 22, 1960.

The rake bars 19 of the raking reel carry rake tines 30 which are positioned much closer together than is ordinarily found on rakes of this type. This is made possible by the fact that there are no stripper rods on the rake. When the reel is rotated, the rake fingers move downwardly and forwardly to a point close to the ground and then upwardly, as indicated by the solid line arrows in FIG. 3.

In order to strip the crop material from the rake fingers 30, pneumatic stripping means is provided comprising a hood or shield 31 having a horizontal portion 32 above the reel 15 and a downwardly extending rear portion 34 behind the reel. The rear portion 34 includes a lower section 35 which extends downwardly and forwardly relative to the rake frame and is provided with a lower terminal edge 36 located closely adjacent to the lowermost point in the path of travel of the fingers 30 on the rake reel. The lower section 35 is connected to angle brackets 38 of the basket structure 14 by bolts 39 extending through suitable vertical slots 40 in section 35 whereby the section can be vertically adjusted to the rake frame. Such adjustment enables the positioning of the lower edge 36 in optimum relationship to the rotating reel.

When the rake travels forwardly, wind passes through the rake reel and engages the shield 31. The air currents are deflected by the shield in a downward direction as indicated by the dotted arrows 41, FIG. 3. When the air currents reach the lower section 35 of the shield, they are directed in a downward forward direction and over the rake fingers of the reel as they pass close to the ground on a working stroke. The movement of air from the lower section 35 serves to pneumatically strip the hay from the rake fingers.

While a portion of the air currents which strip the hay from the rake fingers is derived from wind produced on travel of the rake, a substantial amount of the air is derived from the rapidly rotating raking reel. The rotating rake bars 19 generate air currents which move in a counterclockwise direction (FIG. 3) and cooperate with the shield in providing the pneumatic stripping action. When viewed as shown in FIG. 2, the rake spiders rotate in a counterclockwise direction whereby the rake bars sweep down along the inside of rear wall 34 of shield 31 and substantially contribute to the downward air movement for stripping the hay from the rake fingers. To further assist in the pneumatic stripping action, a shield member or fan element 42 is provided on each rake bar 19 to help generate air currents on rotation of the reel. The combination of the rapidly rotating reel, the fan elements 42 and the forward direction of travel of the rake produces a very substantial and rapid movement of air as indicated by the dotted arrows 41 to thereby cleanly strip material from the rake fingers.

Since the rake structure described has no stripper bars, the rake fingers are mounted very close together and thereby rake cleanly. Further, because of the shield 31 over the top and rear of rake reel 15, wind is prevented from blowing leaves and thin bits of hay through the reel, resulting in their loss. Such leaves and hay are carried in the air currents 41 and deposited in the roll of hay being raked. Then they travel with such hay roll and are discharged in the windrow.

While this invention has been described in connection with a particular embodiment thereof, it will be understood that it is capable of further modification and this application is intended to cover any variations, uses, or adaptations following, in general, the principles of the invention and including such departures from the present disclosure as come within known or customary practice in the art to which the invention pertains and as fall within the scope of the invention or the limits of the appended claims.

Having thus described our invention, what we claim is:

1. A side delivery hay rake comprising, in combination, a wheel supported frame adapted for ground travel in a forward direction, a raking reel mounted on said frame and extending diagonally relative to the travel of said frame, said raking reel comprising a plurality of angularly spaced rake bars disposed about the axis of the reel and on which a plurality of rake fingers are mounted, drive means connected to said reel to rotate the reel at such high speed that air currents are developed, the rotation of said reel being in such direction that the fingers on each bar move downwardly and forwardly to a point close to the ground and then upwardly on each raking stroke, and pneumatic means mounted on said frame for stripping hay raked by said fingers, said pneumatic means comprising a shield substantially the same length as said reel and having a portion above said reel and a downwardly extending portion rearwardly thereof, said rearward portion having a bottom section having a lower terminal edge adjacent the point close to the ground where said reel fingers move, the air currents developed by said reel and by the speed of forward travel of the rake being trapped by said shield and directed downwardly and to strip hay from the reel fingers.

2. A side delivery rake as recited in claim 1 wherein said bottom section is inclined forwardly and is adjustable relative to said frame whereby the location of said lower terminal edge relative to said point close to the ground which said reel fingers move past may be adjusted.

3. A side delivery rake as recited in claim 1 wherein each of said reel bars carries a fan element for assisting in generating air currents on rotation of said reel.

4. A side delivery rake comprising, in combination, a wheel supported frame adapted to travel forwardly, a rotatable reel mounted on said frame and extending diagonally relative thereto, said reel having rake fingers which sweep to a point close to the ground on rotation of said reel, a shield mounted on said frame having a top portion above said reel and a rear portion extending behind the reel, said rear portion including a downwardly and forwardly extending lower section having a lower edge adjacent said point where said fingers sweep, and means for rotating said reel at high speed whereby air currents are developed, said shield guiding said air currents and directing them over said lower section toward said point where said fingers sweep to strip hay from said fingers on operation of said rake.

5. A side delivery rake comprising, in combination, a wheel supported frame adapted to travel forwardly, a rotatable reel mounted on said frame and extending diagonally relative thereto, said reel having rake fingers which sweep downwardly and forwardly to a point close to the ground and then upwardly on rotation of said reel, and means mounted on said frame rearwardly of said reel and operatively associated with the reel for pneumatically stripping hay from said raking fingers, said stripping means comprising an air directing shield having a top portion and rear portion extending downwardly therefrom and behind said reel, said rear portion having a lower section adjacent the sweep of said rake fingers.

References Cited in the file of this patent

UNITED STATES PATENTS

| | | |
|---|---|---|
| 481,501 | Mann | Aug. 23, 1892 |
| 2,201,318 | Neidhart | May 21, 1940 |
| 2,641,895 | Richey | June 16, 1953 |
| 2,657,520 | Lock et al. | Nov. 3, 1953 |
| 2,667,027 | Hauswirth | Jan. 26, 1954 |
| 2,681,543 | Richey | June 22, 1954 |
| 2,929,192 | Hill | Mar. 22, 1960 |

FOREIGN PATENTS

| | | |
|---|---|---|
| 75,795 | Austria | Mar. 10, 1919 |
| 131,824 | Great Britain | Sept. 4, 1919 |
| 863,145 | Germany | Jan. 19, 1953 |